UNITED STATES PATENT OFFICE.

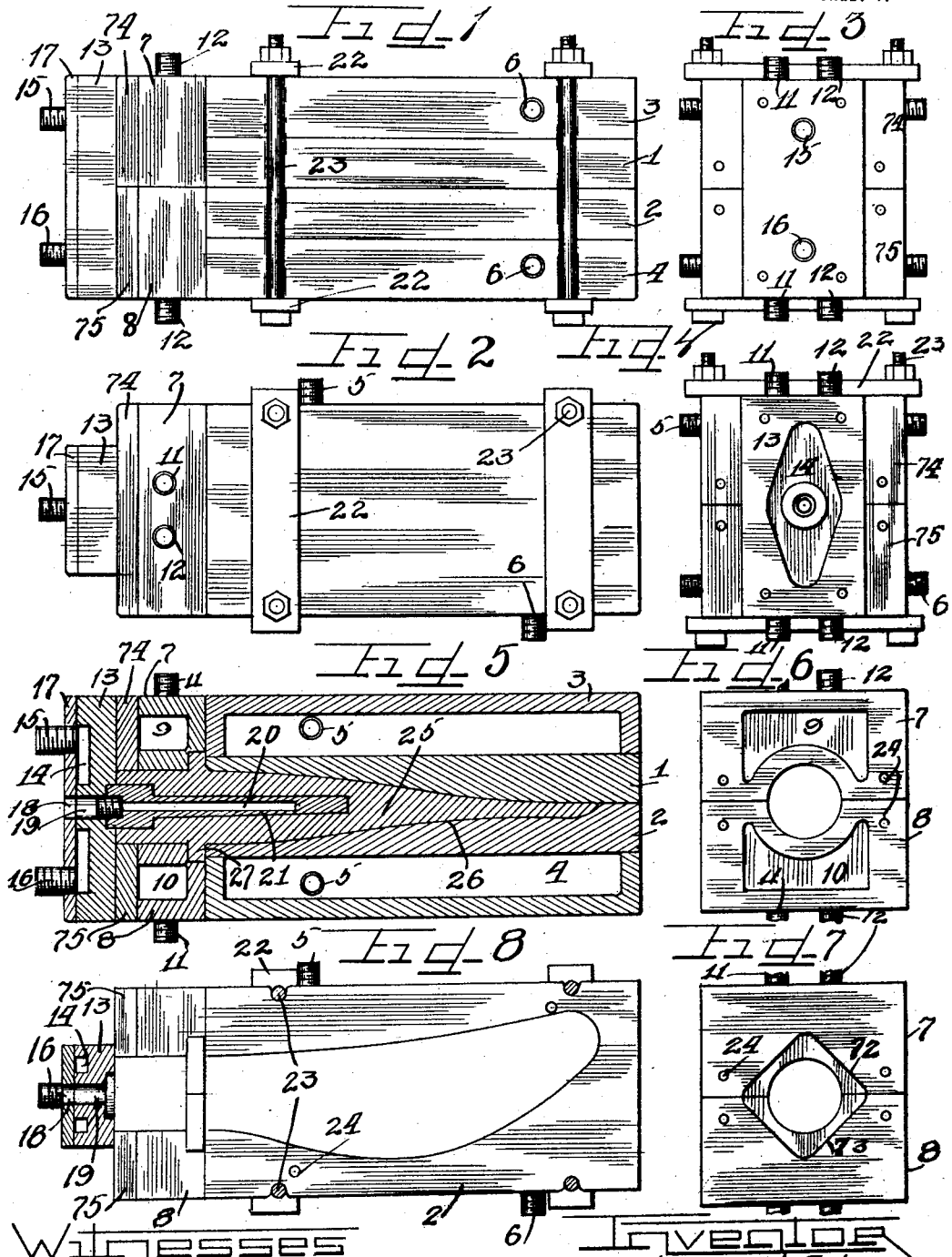

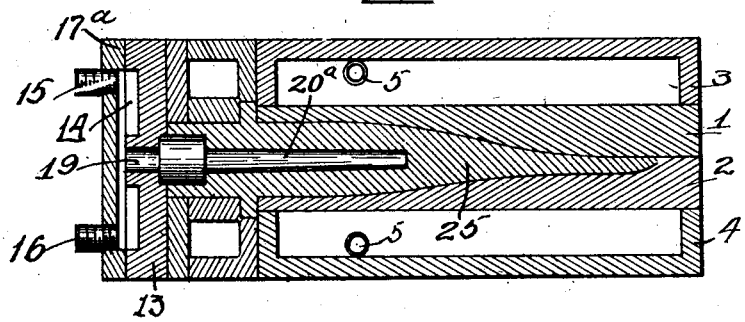
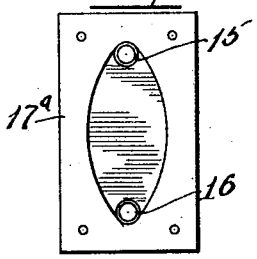 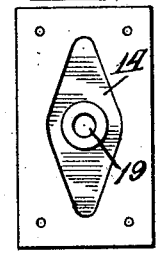
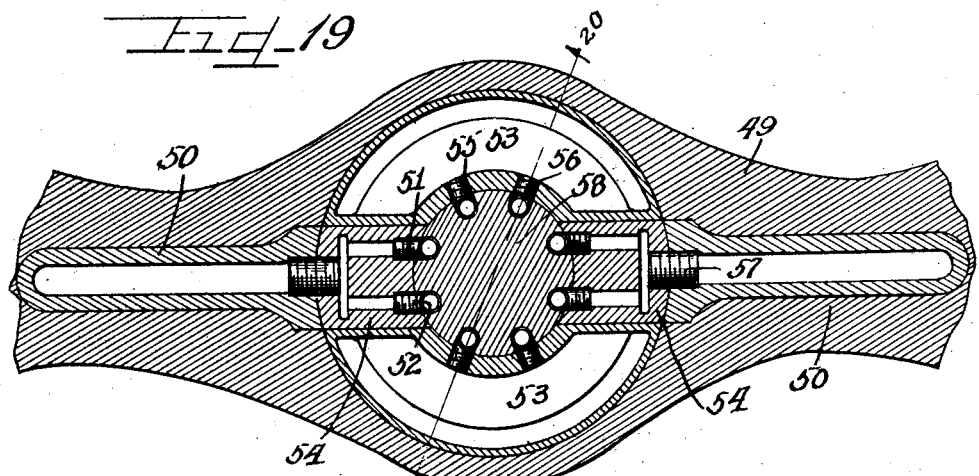

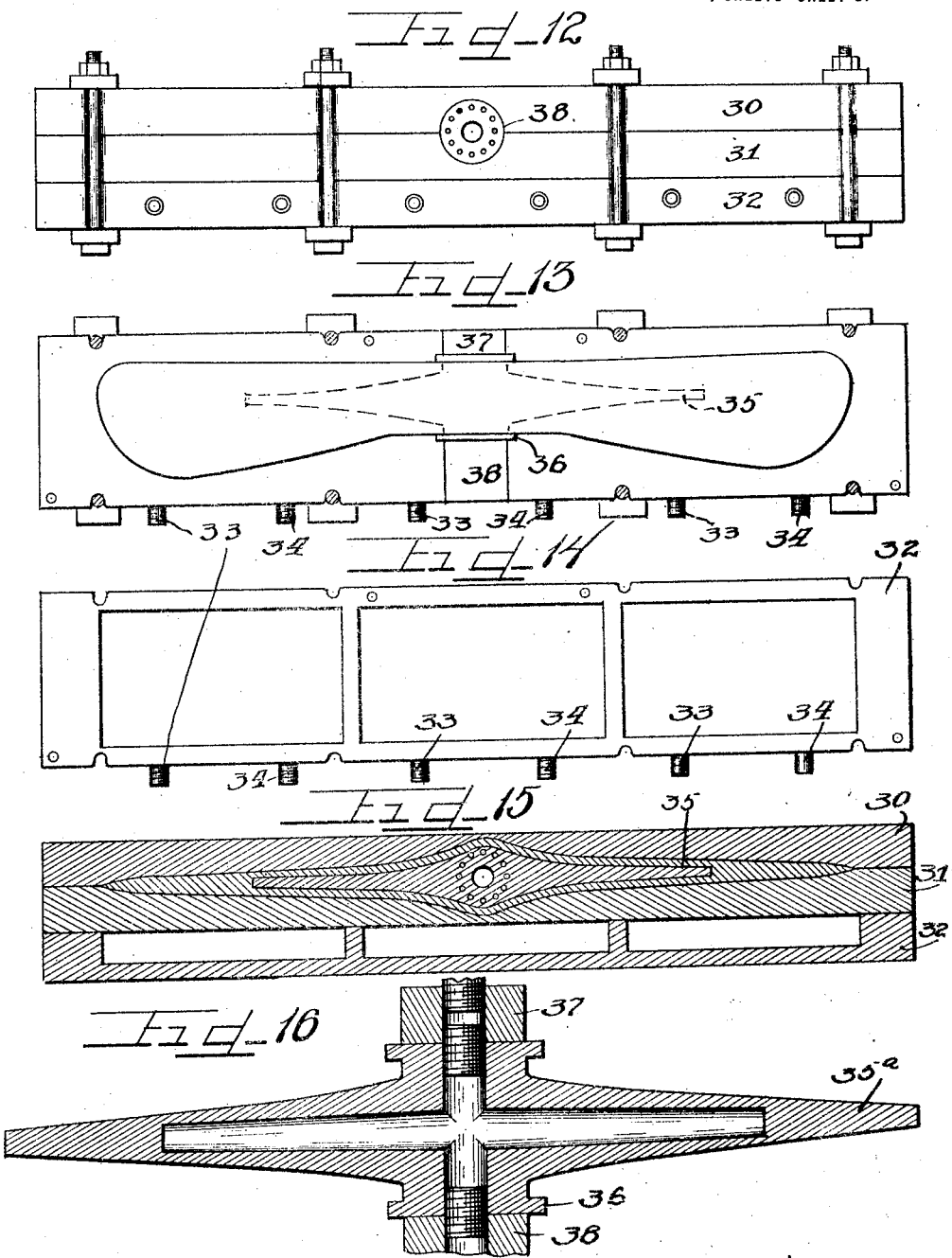

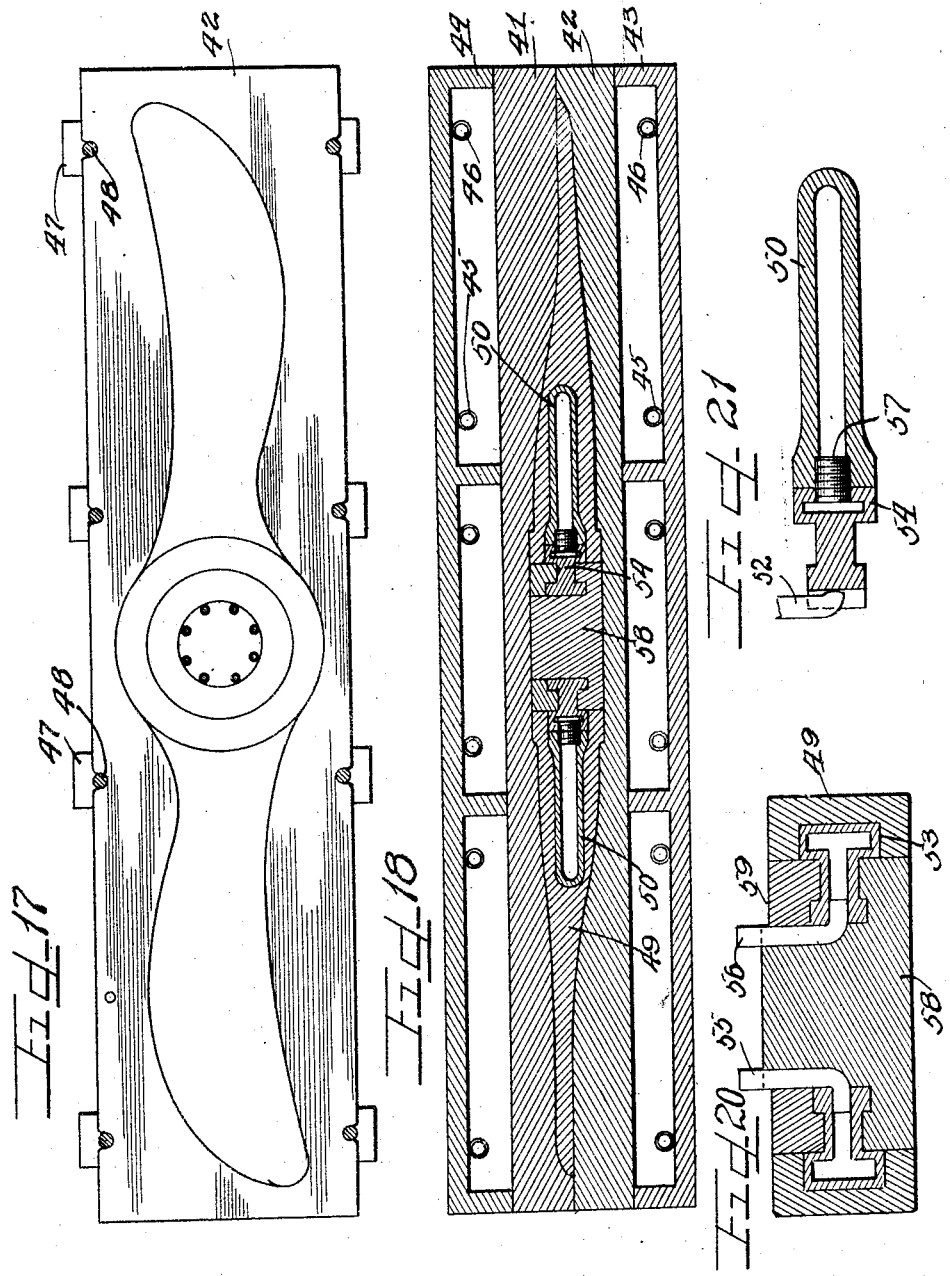

MILES C. ST. JOHN, OF CHICAGO, ILLINOIS.

MOLD FOR AIRPLANE PROPELLERS.

1,411,310.    Specification of Letters Patent.    Patented Apr. 4, 1922.

Application filed February 28, 1921. Serial No. 448,462.

*To all whom it may concern:*

Be it known that I, MILES C. ST. JOHN, a citizen of the United States, and a resident of the city of Chicago, in the county of Cook and State of Illinois, have invented certain new and useful Improvements in a Mold for Airplane Propellers; and I do hereby declare that the following is a full, clear, and exact description of the same, reference being had to the accompanying drawings, and to the numerals of reference marked thereon, which form a part of this specification.

This invention relates to molds for the vulcanizing of propeller blades or of complete propellers for use in connection with airplanes.

It is an object of this invention to provide a mold in which the heat for vulcanizing may be readily applied to all parts of the propeller blade which is to be vulcanized.

It is a further object of this invention to provide a core which may be heated so that the interior surface of the molded object may be vulcanized also.

It is a further object of this invention to provide a mold in which a propeller blade with a core made of a material other than rubber may be vulcanized with the core in place.

It is a further object of this invention to provide a mold for a complete propeller in which the several parts may be heated and in which the mold is readily taken apart for the removal of the vulcanized objects when the operation is complete.

It is a further object of this invention to design a mold so that the flow of heat to the propeller being vulcanized shall be as nearly as possible uniform so that the resulting propeller shall be as nearly as possible of uniform characteristics.

Other and further important objects of this invention will be apparent from the disclosures in the specification and the accompanying drawings.

The invention (in a preferred form) is shown in the drawings and hereinafter more fully described.

On the drawings:

Figure 1 is a front view of one form of mold involving my invention.

Figure 2 is a plan of the same.

Figure 3 is an end elevation.

Figure 4 is an end view of the outermost end parts removed.

Figure 5 is a longitudinal vertical section.

Figure 6 is a view from the same end as Figure 4, with the parts shown in the middle of Figure 4 removed.

Figure 7 is a view of the same end of the propeller mold with the parts shown in Figure 6 removed.

Figure 8 is a horizontal longitudinal section.

Figure 9 is a longitudinal vertical sectional view showing a modification.

Figure 10 is an end view of the inner face of the end piece of the mold shown in Figure 9.

Figure 11 is an end view of the part abutting Figure 10.

Figure 12 is an edge view of a mold for making a complete propeller.

Figure 13 is a horizontal longitudinal section of Figure 12, with the propeller in place.

Figure 14 is a plan view of the lowermost member shown in Figure 12.

Figure 15 is a longitudinal section of Figure 12.

Figure 16 is a view of a modified form of core.

Figure 17 is an end view of the lower half of a mold for making another form of complete propeller.

Figure 18 is a vertical longitudinal section of the mold and propeller shown in Figure 17.

Figure 19 is a horizontal section of the central part of Figure 18.

Figure 20 is a section upon the line 20—20 of Figure 19.

Figure 21 is a detail of certain parts shown in section in Figure 18.

As shown on the drawings:

The mold for a single blade is made up of the recessed plates 1 and 2 which are surrounded by the steam jackets 3 and 4. These steam jackets have inlets 5 and outlets 6. It is the object of this portion of the mold to form the outer surface of the blade proper. The outer surface of the neck and of the flange separating neck and blade are formed by two parts 7 and 8. The part 7 has a chamber 9 and the part 8 has a chamber 10. Steam is admitted to these chambers through the pipes 11 and led from them through the pipes 12. The main plates of the parts 7 and 8 abut against the end plates of the steam jackets 3 and 4. The chambers 9 and 10 are upon the opposite side of the main plates of the parts 7 and 8 from the steam jackets 3 and 4 and are covered by the plates 74 and 75. Upon the same side of the plates 7 and 8 as the steam jackets 3 and 4 are shoulders, as shown in Figure 7, at 72 and 73 to make the flange separating the hub from the blade. Outside of the plates 7 and 8 is another plate 13 containing the chamber 14. This chamber is closed by a cover plate 17, having an inlet 15 and an outlet 16. In the midst of this cover plate is a hole 18 communicating with a passage 19 through the plate 13 leading into the interior 20 of a piece of metal 21 which constitutes the core forming a part of the mold for the propeller blade.

The mold is held together by tie plates 22 and posts 23. Its parts are secured from motion relative to each other by dowel pins shown at 24.

In the use of this mold the recessed plate 2 is laid upon the steam jacket 4 and the part 8 brought into contact with 4. The appropriately shaped piece of soft rubber 25 about to be vulcanized, with the core 21 inserted in it, is then laid upon the specially formed recess 26 of the part 2. That part of the soft rubber body which is to form the lower half of the flange 27 between the blade and the hub is introduced into the recess 73. The plate 1 is then placed on top of 2, its recess contacting with the other surface of the soft rubber which is to become the blade. Next the part 7 is put in place, its recess 72 accommodating the other half of the flange 27. The plates 74, 75 and 13 are then added and the cover plate 17 put on.

The whole is then securely fastened together by bolts 23. Steam is then passed in through the inlets 5 and out of the outlets 6, also through the chambers 9, 10 and 14 by their several inlets and outlets, until the whole mold is heated sufficiently to vulcanize the rubber body. Steam may be introduced through the opening 19 into the interior 20 of the core 21. The steam in the chambers 9 and 10 not only vulcanizes the hub part of the body but assists in heating the core. When the vulcanizing is over the mold is taken apart, the blade 25 lifted out and the core 21 removed therefrom. The blade is then ready for use and it may then be assembled with other blades to form a propeller.

A modification is shown in Figures 9 to 11 in which the core 20ª is shown solid instead of hollow. No steam is therefore introduced into the interior of this core. The cover plate 17ª consequently is made without a central hole, but it has a steam inlet 15 and an outlet 16. The chamber 14 in the plate 13 is not changed but the cover plate 17 is made enough higher so that it does not contact with the boss at the center of the chamber 14 containing the passage 19.

The modification shown in Figures 12 and 13 is for the purpose of vulcanizing a complete propeller instead of a single blade. The propeller is to have a core that remains in it. The mold for the propeller includes an upper part 30 and a lower part 31. Within these a specially formed cavity to hold the propeller is provided. Below the part 31 is illustrated a steam jacket 32 having a plurality of chambers in which there are inlets 33 and outlets 34 for steam. A similar steam jacket is not shown above 30 in order to illustrate that the mold may be used with or without the steam jackets. When it is used without a steam jacket the whole mold is inserted in an oven for vulcanizing. When it is used with steam jackets it is the intention that there should be one above 30 as well as below 31.

The mold is intended for propellers which are to permanently contain a wooden or a metal core. The core of wood is of the form shown in dotted lines at 35 in Figures 13 and 15.

If the propeller is to have a hub that projects, the wooden core may include the parts shown in full lines at 37 and 38; if not, filler pieces are inserted at 37 and 38 so that the same mold can be used for other forms. These filler pieces are provided with holes through one or more of which pins may be inserted which go through the holes in the wooden core provided for bolting the propeller to its shaft. These pins serve to position the core accurately within the mold and to support it within the soft rubber until the same is vulcanized.

The metal core 35ª shown in Figure 16 has a hub shorter than the width of the mold. The pieces 37 and 38 are therefore shown there as filler pieces. When the hub extends to the surface of the mold these are not necessary. When used they are supplied with holes to align with the holes in the hub as in the case of the wooden core. With the metal core it is also desirable to add steam connections for heating the interior of the body of rubber, as are indicated in Fig. 16.

When an entire propeller is to be molded at once and there is to remain no core within the hollow finished propeller the form of mold shown in Figures 17 to 21 is used. Here there are the usual recessed plates 41 and 42 heated by the steam jackets 43 and 44 each containing several chambers with inlets 45 and outlets 46. The whole is connected by tie plates 47 and bolts 48.

The body 49 of soft rubber has within it a cavity occupied by the vulcanizing members 50, each of which is hollow and is fed from a chamber in the part 54 having an inlet 51 and an outlet 52, which are most clearly shown in Figure 19. This figure does not show the whole mold; a portion of the soft rubber body is shown, the outline of which corresponds to the outline of that body at the central part of the mold.

The core to form the hollow part of the hub of the propeller has its outline formed by four pieces, two pieces 53 co-operating with two pieces 54, and includes other pieces for holding these in place. The pieces 54 are hollow and communicate with the hollow vulcanizing members 50 and are fed as already explained by inlets 51 and outlets 52. The filler blocks 53 are hollow and are fed by inlet and outlet connections 55 and 56. The members 50 and 54 are secured together by hollow threaded pipe couplings 57. The inlet and outlet pipes 51, 52, 55 and 56 pass up through grooves in the central filler block 58 and connect with passages not shown in the plate 41. These grooves are sufficient to permit motion of the part 58 along the pipes without binding.

Below the members 53 the part 58 is of sufficient diameter to extend all the way to the rubber body 49. Above the members 53 the part 58 is only of sufficient diameter to extend to the innermost surface of the parts 53 and 54. The remainder of the space between the upper part of the member 58 and the rubber 49 is filled by an annular filler block 59.

The operation of this form of the device will be well understood from a description of how the finished vulcanized propeller is removed from the mold. When the vulcanization is completed the parts are in the relation indicated by Figures 18 and 19. To remove the propeller from the mold the parts 44 and 41 are first lifted off. The propeller is then lifted out of the part 42 and the parts 50 to 59 come with it. The member 58 may then be removed from the propeller. If, as frequently is the case, this member sticks it can be started by striking its smaller end with a hammer. The removal of member 58 enables the workman to get at the inner edge of the annular member 59 and it may be removed by inserting a tool between it and the upper inside edge of either of the members 53 or 54. The member 54 may then be drawn toward the center of the hub and with it the member 50 will be withdrawn from the hole in the rubber. When the member 54 has been moved far enough to be free from the members 53 it may be rotated and the part 54 may thus be unscrewed from the part 50. When this has been done the other member 54 may be removed in a similar manner. The members 53 are then readily accessible and may be conveniently removed. The members 50 have then ample space within which they may be moved to remove first one and then the other. With this explanation the operation of assembling the mold will be obvious since the operations are only performed in the opposite order, first inserting the members 50, then securing the members 54 thereto and inserting the members 53 in place, after which the member 59 is placed and the member 58 driven home. The whole is then placed within the mold.

I am aware that numerous details of construction may be varied through a wide range without departing from the principles of this invention, and I therefore do not purpose limiting the patent granted otherwise than necessitated by the prior art.

I claim as my invention:

1. A hollow metal core for a vulcanized rubber propeller blade, a filler block for the hub of said propeller, and a threaded hollow pipe connection between the two.

2. A mold for a vulcanized rubber propeller comprising a circular filler block for the hub of said propeller, hollow core members for the interior of the blade, hollow filler blocks between said circular member and said hollow core members, inlet and outlet connections for leading a heating fluid into the interior of said filler blocks and cores.

3. In a mold for a propeller blade two core members, two connecting members at the neighboring ends of said core members, arcuate filler blocks on each side of said connecting members, a circular filler block concentric with said arcuate members and extending above them, and an annular filler block above and concentric with said circular filler block.

4. A means for supporting a core within the interior of a mold for a vulcanized rubber propeller consisting of two filler blocks having holes in alinement with the holes through the hub of the propeller, and a pin through said alined holes.

In testimony whereof I have hereunto subscribed my name in the presence of two subscribing witnesses.

MILES C. ST. JOHN.

Witnesses:
CARLTON HILL,
JAMES M. O'BRIEN.